(12) United States Patent
Ananthanarayanan et al.

(10) Patent No.: US 10,387,564 B2
(45) Date of Patent: Aug. 20, 2019

(54) AUTOMATICALLY ASSESSING DOCUMENT QUALITY FOR DOMAIN-SPECIFIC DOCUMENTATION

(75) Inventors: Rema Ananthanarayanan, New Delhi (IN); Biplav Srivastava, Noida (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 619 days.

(21) Appl. No.: 12/944,970

(22) Filed: Nov. 12, 2010

(65) Prior Publication Data

US 2012/0123767 A1    May 17, 2012

(51) Int. Cl.
*G06F 17/27*    (2006.01)

(52) U.S. Cl.
CPC .................... *G06F 17/274* (2013.01)

(58) Field of Classification Search
CPC ............... G06F 3/00; G06F 3/14–1454; G06F 17/20–28; G06F 17/30–30011; G06F 17/30286–30746; G06F 17/30769–30775
USPC ........ 704/6, 9; 705/1.1–6, 7.11, 30–34, 300, 705/342–346, 500; 715/200–204, 715/221–226, 243–254, 265–272; 434/81, 109, 156; 382/112
See application file for complete search history.

(56) References Cited

U.S. PATENT DOCUMENTS

| | | | |
|---|---|---|---|
| 6,038,561 A * | 3/2000 | Snyder et al. | |
| 6,128,613 A * | 10/2000 | Wong et al. | 707/738 |
| 6,181,909 B1 * | 1/2001 | Burstein et al. | 434/353 |
| 6,356,864 B1 * | 3/2002 | Foltz et al. | 704/1 |
| 7,028,250 B2 * | 4/2006 | Ukrainczyk et al. | 715/202 |
| 7,110,573 B2 * | 9/2006 | Monk et al. | 382/112 |
| 7,139,752 B2 * | 11/2006 | Broder et al. | |
| 7,246,311 B2 * | 7/2007 | Bargeron et al. | 715/251 |
| 7,363,214 B2 * | 4/2008 | Musgrove et al. | 704/9 |
| 7,568,148 B1 * | 7/2009 | Bharat et al. | 715/200 |
| 7,788,292 B2 * | 8/2010 | Kolcz et al. | 707/803 |
| 7,813,916 B2 * | 10/2010 | Bean | 704/9 |
| 7,958,136 B1 * | 6/2011 | Curtis | G06F 16/313 707/758 |
| 8,014,996 B1 * | 9/2011 | Kinder | 704/1 |
| 8,019,595 B1 * | 9/2011 | Kinder | 704/9 |
| 8,176,046 B2 * | 5/2012 | Druzgalski et al. | 707/731 |
| 8,202,098 B2 * | 6/2012 | Attali | 434/322 |
| 8,265,925 B2 * | 9/2012 | Aarskog | 704/9 |
| 8,296,168 B2 * | 10/2012 | Subrahmanian | G06F 17/275 705/7.11 |
| 8,315,849 B1 * | 11/2012 | Gattani et al. | 704/2 |
| 8,438,037 B2 * | 5/2013 | Cates et al. | 705/1.1 |

(Continued)

OTHER PUBLICATIONS

Yadav, Surya B., "Automation of webpage quality determination", International Journal of Information Quality, vol. 2, No. 2 / 2008, pp. 152-176.

*Primary Examiner* — Fariba Sirjani

(74) *Attorney, Agent, or Firm* — Ference & Associates LLC

(57) ABSTRACT

Methods and arrangements for document quality assessment. Documents are accepted and a quality specification containing predetermined quality criteria is assimilated. Each document is assessed based on the predetermined quality criteria, and a quality score is assigned to each document, the quality score being a function of positive and negative attributes assessed for each document.

16 Claims, 7 Drawing Sheets

(56) References Cited

U.S. PATENT DOCUMENTS

| | | | |
|---|---|---|---|
| 8,463,594 B2* | 6/2013 | Au | 704/9 |
| 2001/0049671 A1* | 12/2001 | Joerg | G06F 17/30864 |
| | | | 706/50 |
| 2002/0055940 A1 | 5/2002 | Elkan | |
| 2002/0099730 A1* | 7/2002 | Brown et al. | 707/500 |
| 2004/0078750 A1* | 4/2004 | Frank | 715/500 |
| 2004/0243556 A1* | 12/2004 | Ferrucci | G06F 16/3344 |
| 2006/0100852 A1 | 5/2006 | Gamon et al. | |
| 2007/0133842 A1* | 6/2007 | Harrington | 382/112 |
| 2008/0082352 A1* | 4/2008 | Schmidtler et al. | 705/1 |
| 2009/0161916 A1 | 6/2009 | Ma | |
| 2009/0164233 A1* | 6/2009 | Arnold et al. | 705/1 |
| 2009/0248399 A1* | 10/2009 | Au | 704/9 |
| 2010/0114587 A1* | 5/2010 | Masuyama et al. | 705/1.1 |
| 2010/0179827 A1* | 7/2010 | McCallie et al. | 705/3 |
| 2010/0313114 A1* | 12/2010 | Colbran | G06F 17/2247 |
| | | | 715/230 |
| 2011/0055811 A1* | 3/2011 | Ananthanarayanan et al. | |
| | | | 717/120 |
| 2011/0137900 A1* | 6/2011 | Chang et al. | 707/737 |
| 2011/0280450 A1* | 11/2011 | Nepomniachtchi et al. | |
| | | | 382/112 |
| 2012/0123767 A1* | 5/2012 | Ananthanarayanan et al. | |
| | | | 704/9 |

* cited by examiner

QS Sample (product usage manual)

Encourage
- Level of user familiarity
- Time expected
- Tools and resources expected
- Features Penalize
- Technical design

AUTOMATICALLY ASSESSING DOCUMENT QUALITY FOR DOMAIN-SPECIFIC DOCUMENTATION

BACKGROUND

Generally, the assessment of document quality, particularly via automatic arrangements, can be highly valuable. It can help improve the quality of work products, and enhance customer satisfaction, for instance. It can lead to a considerable reduction of errors in connection with misunderstandings or mistakes in actions that might be taken on the basis of documents. Better filtering can also result, along with a capability to effectively reuse relevant documents.

However, conventional arrangements are highly limited at best in even attempting to pursue features such as these. For instance, conventional arrangements include a capability for very generally checking quality in terms of ease-of-reading, while special services are also available that aim to promote standard terminology across documents, e.g., for a single enterprise. However, general shortcomings still run rampant in that manual review and the use of templates are normally mandated, while automatic evaluation basically does not exist. As but one example of such shortcomings, even when templates are mandated, there is essentially no way to check that they are consistently followed or that mandatory information is provided.

BRIEF SUMMARY

In summary, one aspect of the invention provides a method comprising: accepting documents; assimilating a quality specification containing predetermined quality criteria; assessing each document based on the predetermined quality criteria; and assigning a quality score to each document, the quality score being a function of positive and negative attributes assessed for each document.

Another aspect of the invention provides an apparatus comprising: one or more processors; and a computer readable storage medium having computer readable program code embodied therewith and executable by the one or more processors, the computer readable program code comprising: computer readable program code configured to accept documents; computer readable program code configured to assimilate a quality specification containing predetermined quality criteria; computer readable program code configured to assess each document based on the predetermined quality criteria; and computer readable program code configured to assign a quality score to each document, the quality score being a function of positive and negative attributes assessed for each document.

An additional aspect of the invention provides a computer program product comprising: a computer readable storage medium having computer readable program code embodied therewith, the computer readable program code comprising: computer readable program code configured to accept documents; computer readable program code configured to assimilate a quality specification containing predetermined quality criteria; computer readable program code configured to assess each document based on the predetermined quality criteria; and computer readable program code configured to assign a quality score to each document, the quality score being a function of positive and negative attributes assessed for each document.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 3 provides a sample quality best practice specification for a product use manual.

DETAILED DESCRIPTION

Figure 1:
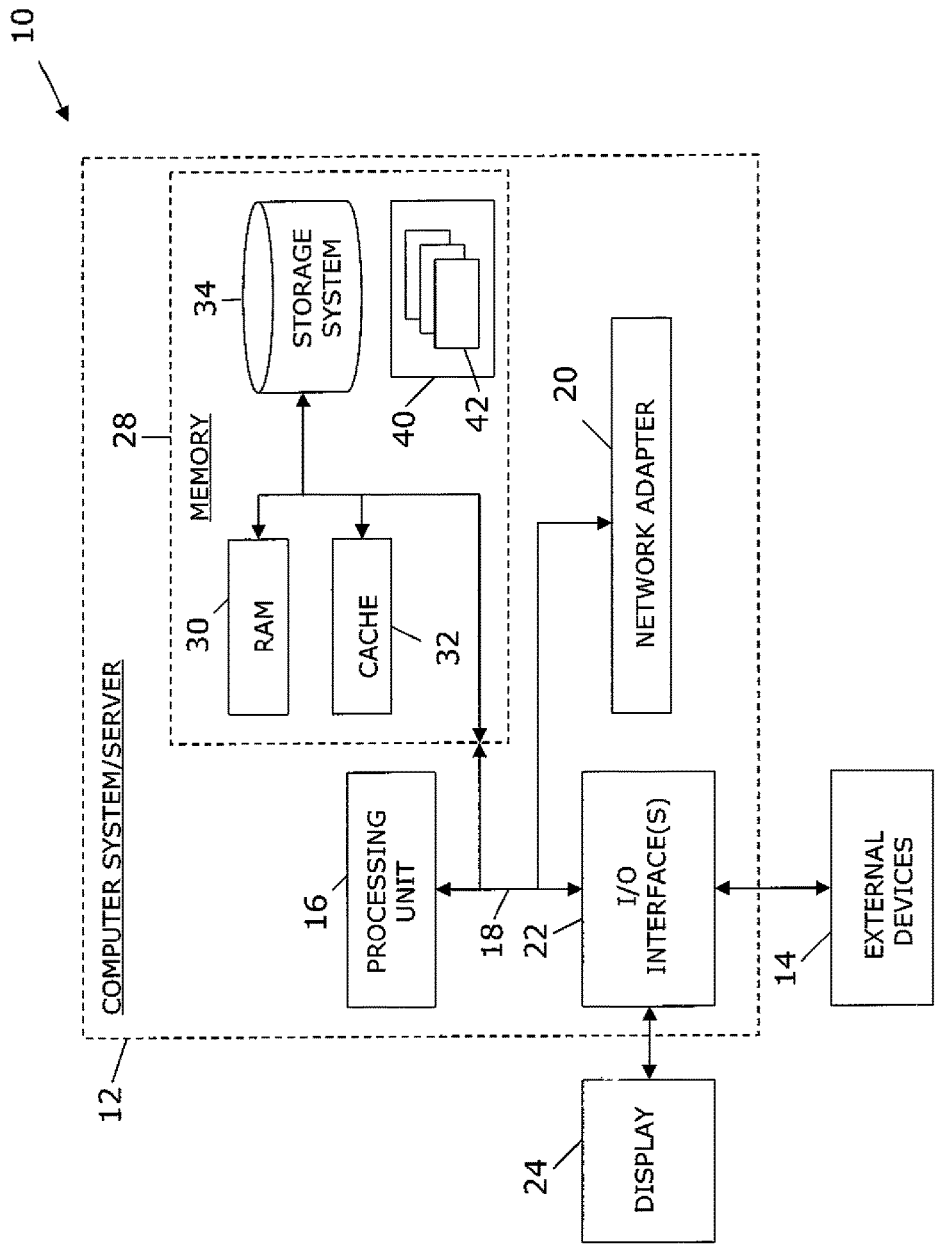
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The disclosure now turns to FIGS. 2-6. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2-6 can be performed or utilized by way of a processing unit or units and system memory such as those indicated, respectively, at 16 and 28 in FIG. 1, whether on a server computer, a client computer, a node computer in a distributed network, or any combination thereof.

There are several examples of documents where quality assessment is highly relevant. Such types of documents include, but by no means are limited to: documents at different stages of a software lifecycle (e.g., functional and design specs, technical documents, requirement documents); contractual documents; project proposals; training material; survey forms, reviews, and questionnaires.

It can be appreciated that business documentation presents unique challenges and characteristics in the context of automatic review. Generally, such documents can often include not just text but also additional objects such as images and flow-charts. Such documents are often collaboratively created and intended for reuse. Variability is common in customer requirements and expertise of individual consultants. It can be appreciated that high quality is important for improving business effectiveness and efficiency. At the same time, quality is generally not quantified or tracked in conventional arrangements.

Generally, in conventional arrangements, documents are reviewed for quality by peers who evaluate it on some criteria, which need not be explicitly stated. In most cases, these are domain experts and subject matter experts. While domain experts may make many assumptions in terms of audience proficiency or knowledge of the subject, for general checks like language correctness, general experts in language could assess the merits or quality of the document. However, domain experts tend not to be language experts. Furthermore, document quality criteria are rarely standardized.

Broadly contemplated herein, in accordance with at least one embodiment of the invention, are methods and arrangements where one or more documents are accepted as input along with a "quality best practice" specification. The output then is a tuple $<d_i, r_i>$ where $r_i$ is a quality rating for document $d_i$ in a predetermined scale, such as a scale of 0 . . . 1 (that is, from zero and one).

Also contemplated herein, in accordance with at least one embodiment of the invention, is the use of additional input in the form of a quality threshold t, thereupon yielding additional output in the form of a list of documents that fall above or below the threshold t.

In accordance with at least one embodiment of the invention, quality attributes in a quality best practice specification can include a variety of attributes. A relevance attribute assesses whether all desired information is presented, the document serves a predetermined purpose and irrelevant information is avoided. Such information can include a table of contents, introduction, target audience, base assumptions, and other information (i.e., other items/sections that are reviewed for the relevance attribute, which could include tables of contents or contents in such items/sections). A writing clarity attribute, on the other hand, assesses whether accepted conventions are followed on good quality writing. Thus, for example, an assessment is made as to whether jargon is avoided, a glossary is provided, sentences are not too long, illustrations are provided where relevant, section lengths are uniform, acronyms are explained, short sentences are provided with words of lesser syllables, etc. Features of the language can be assessed, which may include the usage of standard term, linguistic cues that encourage active voice over passive, and other qualitative measures. Yet another attribute assesses whether further figures, flow charts and other components complement the document, whereupon a measurement is provided in assessing the readability and re-usability. These attributes are presented merely by way of illustrative and non-restrictive examples, and by no means are intended to be necessarily exhaustive.

Generally, in accordance with at least one embodiment of the invention, simple tests are employed to assess the readability of a document. For example, the Flesch Reading Easiness test determines how easy it is to read a document. Higher scores indicate that a document is easy to read, while lower scores indicate that the document is more difficult to read. The score itself is defined as 206.876−1.015 (total words/total sentences)−84.6 (total syllables/total words.)

Tools also exist that aid in computing some pertinent measures. For instance, in "MS WORD" (produced by Microsoft, Inc. of Redmond, Wash.), a 'Tools' option checks the readability of a document as follows. First, within 'Tools', there is an option 'Spelling and Grammar', which again lists many options that the user may set. One of these options that can be set is 'Show readability statistics.' If this option is selected, then, after using the tool to check the grammar, the tool displays the readability score, in the readability statistics.

Generally, there exist many known simple parsing tools and annotators that are able to check for the existence of sections with specific titles, or specific keywords, in a given document.

In accordance with at least one embodiment of the invention, an input quality best practice specification (or "quality specification", or "QS", as may be variously referred to herein) includes rules setting forth "encourage" or positive criteria, and "penalize" or negative criteria. The "encourage" and "penalize" criteria, in accordance with an embodiment of the invention, are incorporated into an algorithm that is discussed in more detail further below. The rules, for their part, are also split into "dataset-dependent" rules and "dataset-independent" rules. Generally, dataset-dependent rules can be viewed as domain-specific rules, while dataset-independent rules can be viewed as domain-independent rules. The Quality Specifications themselves could be specified in various ways. In a simple case, it could be a listing of terms that need or are desired to exist in the document. In a more advanced case, it could be the inputs to a software program that takes as input a set of terms that need to exist in the document, and presents as output a quality score. A QS input can take any of a wide variety of conceivable forms, including, but certainly not limited to, a list of terms in a text file, or entries (that a user can have entered) in a form, a webpage or other GUI (Graphical User Interface) arrangement.

Generally, in accordance with at least one embodiment of the invention, a sample QS can be structured as follows:
  dataset-dependent rules: Encourage section—sections in the document, minimum text size per section; Penalize section—process flow in detail document (as it should be in separate work product).
  dataset-independent rules: Encourage section—short sentences; Penalize section—acronyms, passive voice.

FIGS. 2-5 provide sample QS's in accordance with at least one embodiment of the invention, relating to different types of documents or different domains/enterprises that might be encountered. The examples in FIGS. 2-5 are merely illustrative and not intended to be restrictive in terms of the manner in which a QS might be configured.

Figure 2:
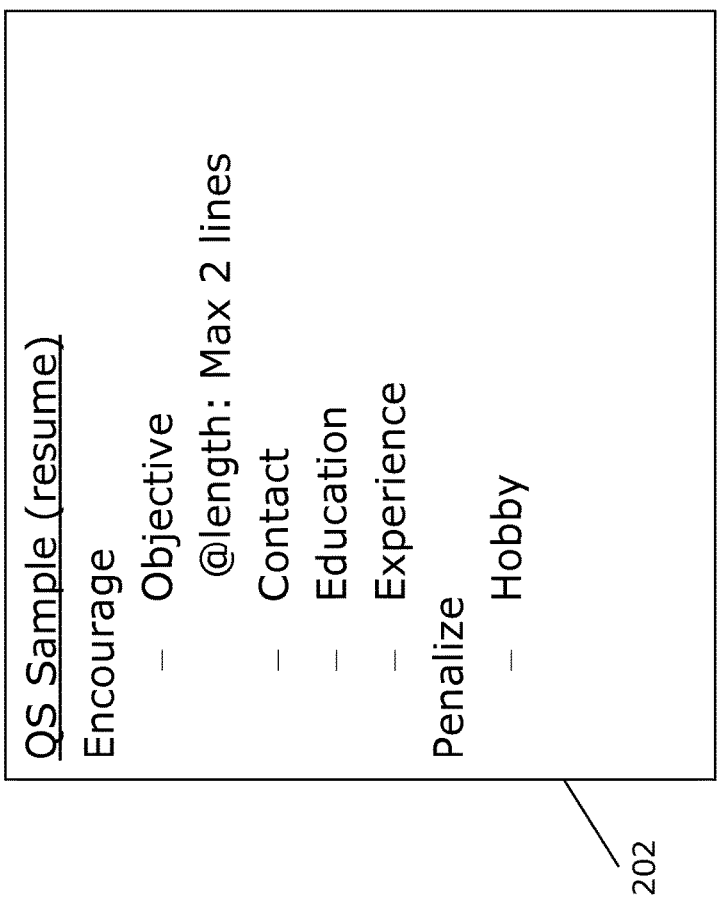
FIG. 2 provides a sample quality best practice specification for a resume.

FIG. 2 provides a sample QS 202 for a resume. In this example, QS 202 is structured as follows:

Dataset-dependent rules: Encourage section—sections in the document (e.g., Objective, Contact, Education, Experience), size per section (e.g., Objective<=2 lines); Penalize section—inclusion of hobby.

Dataset-independent rules: Encourage section—short sentences; Penalize section—acronyms, passive voice.

FIG. 3 provides a sample QS 302 for a product use manual. In this example, QS 302 is structured as follows:

Dataset-dependent rules: Encourage section—states the level of user familiarity assumed for the document, states the level of preparation expected, states the features and how these may be used; Penalize section—discusses the technical design of each feature. (In this sample QS 302, there are no dataset-independent rules.)

Figure 4:
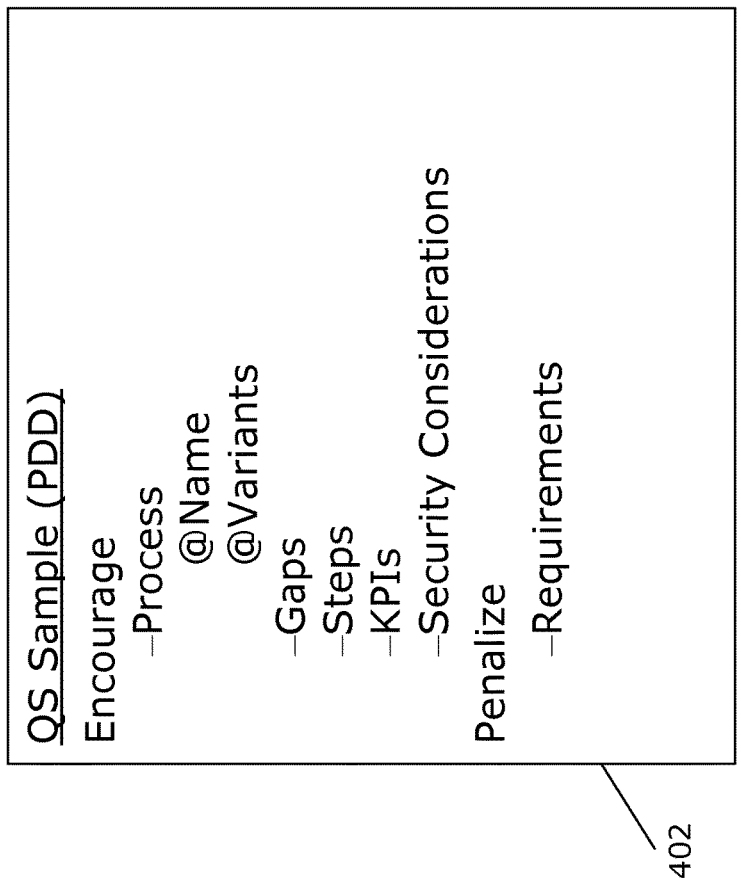
FIG. 4 provides a sample quality best practice specification for a process definition document.

FIG. 4 provides a sample QS 402 for a PDD (process definition document in SAP [Systems Applications and Products]). In this example, QS 402 is structured as follows:

Encourage section—process (name, variants), gaps, steps, KPI's (key performance indicators), security considerations; Penalize section—requirements. (In this sample QS 402, the rules are understood to be dataset-dependent only.)

Figure 5:
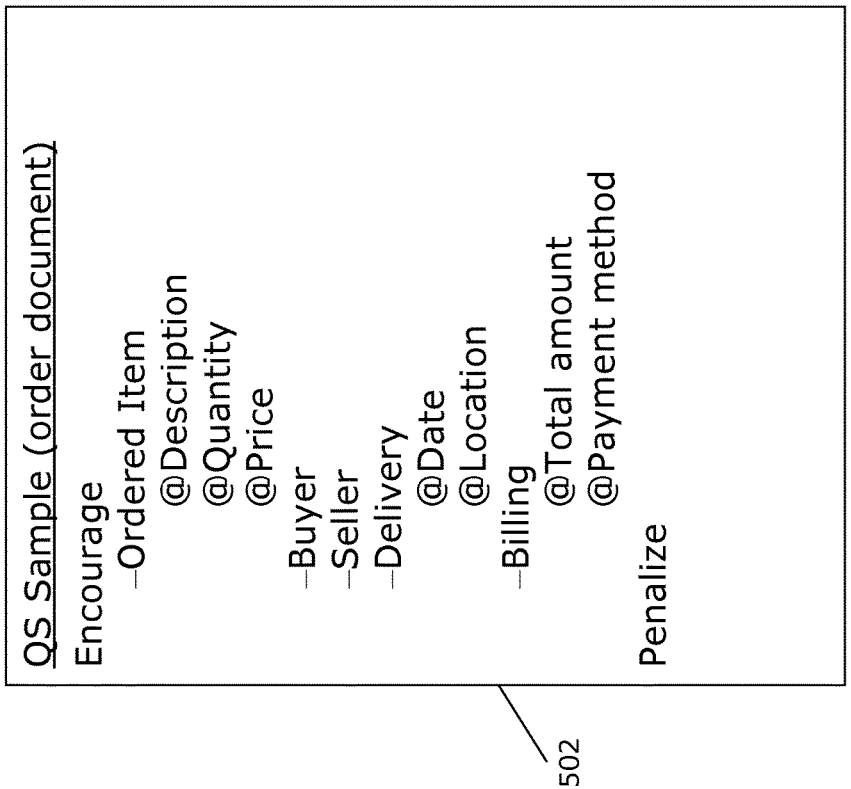
FIG. 5 provides a sample quality best practice specification for an order document.

FIG. 5 provides a sample QS 502 for an order document. In this example, QS 502 is structured as follows:

Encourage section—ordered item (description, quantity, price), buyer, seller, delivery (date, location), billing (total amount, payment method). (In this sample QS 502, there is no penalize section and the rules are understood to be dataset-dependent only.)

Figure 6:
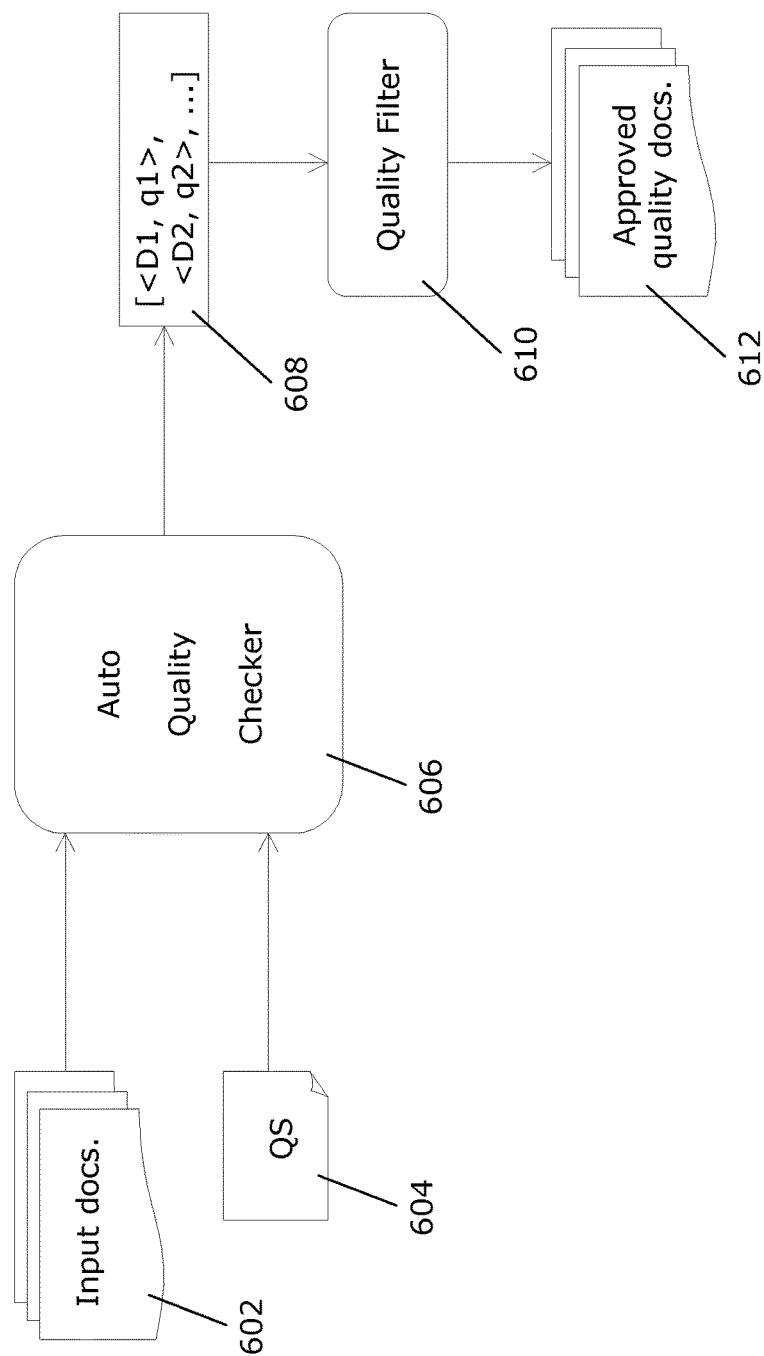
FIG. 6 schematically illustrates a system architecture.

FIG. 6 schematically illustrates a system architecture, in accordance with at least one embodiment of the invention; an appreciation is also lent here of how, in accordance with at least one embodiment of the invention, an input QS and set of documents can be automatically assessed and reconciled with one another to yield tuples. As shown, input documents 602 and a QS 604 are input into an automatic quality checker 606. The output thereof is a set of tuples $<d_i, r_i>$(608), one for each document, where $r_i$ is a quality rating for document $d_i$ on a scale of 0 to 1. A quality filter 610 then applies a quality threshold t, itself between 0 and 1, so that documents which exceed the threshold t are output as approved quality documents 612.

In accordance with at least one embodiment of the invention, there are employed UIMA (Unstructured Information Management Analysis) annotators in quality checker 606 that provide a framework for performing operations on input documents 602 and QS 604. Such annotators may perform simple operations such as counting the number of words in a document or identifying the nouns in a document. They may perform more complex functions such as automatically identifying keywords related to a set of documents. It is recognized that there exist standard and well-defined annotators to perform these individual or composite functions.

Further, UIMA provides a frame-work to run these multiple annotators together, in a sequence. For instance, the first annotator may go through the set of documents 602 and identify all the section headings, the second annotator may go through the set of documents and check for a phrase such as 'Best practices', the third annotator may parse each document and count the number of words in each section, etc.

By way of determining the quality rating $r_i$, in accordance with at least one embodiment of the invention, first, as touched on hereinabove, different parameters are defined under which document quality will be assessed. Examples may include, for instance, readability and modularity. Next, the Encourage and Penalize criteria are defined (e.g., short sentences, structural heads, etc.). For the sake of simplicity and manageability, these criteria may be combined across the different heads (from a grammatical/linguistic point of view).

Next, in accordance with at least one embodiment of the invention, weights are assigned for each of the Encourage and Penalize attributes. To this end, let $w_{ei}$ represent the weight for the i'th Encourage attribute and $w_{pj}$ represent the weight for the j'th Penalize attribute. If there are $m_1$ Encourage attributes (across all the quality parameters) and $m_2$ Penalize attributes (across all the quality parameters) then the document quality may be assessed as:

$$\text{quality} = \frac{1}{m_1} \sum_{i=1}^{m_1} w_i e_i - \frac{1}{m_2} \sum_{j=1}^{j=m_2} w_j p_j$$

In accordance with at least one embodiment of the invention, weights w are set by the user, based on his or her domain knowledge. As such, the user may well determine that there are cases where the weights could be uniform, where all have equal value. On the other hand, they could be non-uniform, even to an extent that the user determines some attributes to have proportionately much greater weights than others. For instance, when evaluating a resume, the information on work experience could have a very high weight, whereas the information on languages known could have very low weight.

In accordance with at least one embodiment of the invention, an example of assigning weights for a sample document could be as follows. Consider an evaluation criteria for evaluating the quality of a resume for the post of a software engineer. The various attributes could be [age, highest qualification, years of experience in programming, skills in various operating system platforms, familiarity with various database platforms]. The weights assigned by the evaluator could then be: [(age,1), (highest experience,6), (years of experience in programming, 10), (skills in various operating system platforms, 7), (skills in various database platforms, 8)]. In this example there are no "penalize" attributes.

When a resume is passed through the annotators in quality checker 606 and the various pieces of information identified, assuming the resume has all the attributes identified, the quality of the resume may be scored as:

Quality=⅕(1+6+10+7+8)=6.4.

Another resume which does not have the information related to experience would be scored as:

Quality=⅕(1+6+7+8)=4.2.

It will be appreciated that, in accordance with at least one embodiment of the invention, no specialized rule system needs to be learned for the QS's, no specific weight function is required to be given by user in that the system will automatically normalize and, it can be appreciated, the split between domain-dependent and domain-independent date implies that a user need only focus on; user needs to focus on domain-dependent unless there is a desire to change the attributes via which the system is evaluated.

In accordance with at least one embodiment of the invention, where documents are highly structured and follow some template, it is possible to automate some or all of the steps. Within a narrower context of business process documents, larger degrees of automation may be possible. To elaborate, some quality assessments can be fully automated end-to-end. However, other assessments may be partially automated, where the system provides scores for what it can automatically assess, with manual steps being used to assess other aspects of the documents, and arrive at scores manually. The two scores could then also be combined as relevant.

In defining a QS, in accordance with at least one embodiment of the invention, the following could represent some of the criteria for which, if answers are known at the outset, some degree of automation is possible:

Do we know the domain?
Do we know the target audience?
Is there a template, again, implicit or explicit?
Is there a repository of documents that are known to be good (or reverse)?
Do we know the objective of the document writer?
Are there best practices stipulated?

Some quantifiable criteria for unsatisfactory documentation could include, in accordance with at least one embodiment of the invention:

Is it a long piece of text, without much structure?
Does it miss identifying the objective at the start?
Is it a technical document with no supporting structures like tables, figures etc.?
Does it use lots of abbreviations, jargon?
Is it in passive voice, with long sentences, long words etc?
Is it known to depart from a template or structure?

Figure 7:
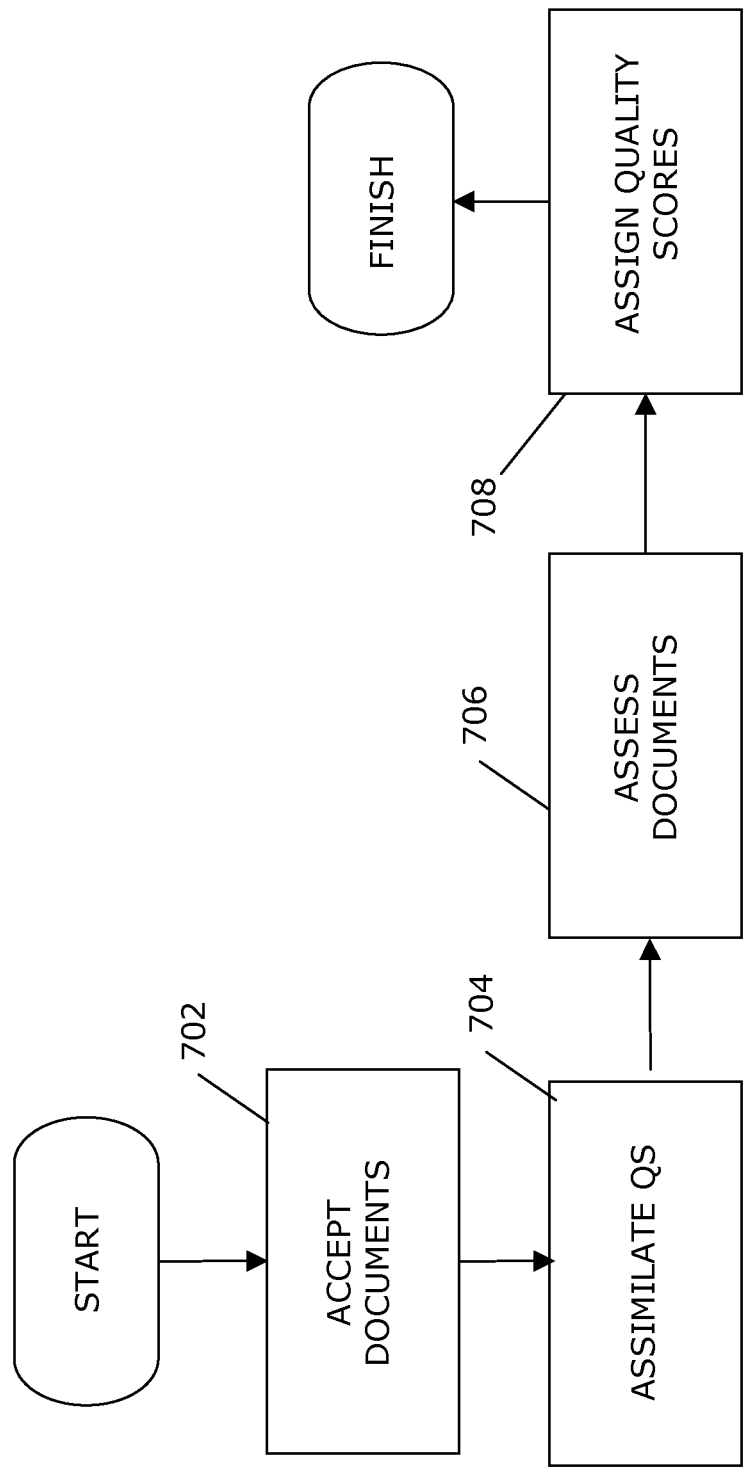
FIG. 7 sets forth a process more generally for document quality assessment.

FIG. 7 sets forth a process more generally for document quality assessment, in accordance with at least one embodiment of the invention. It should be appreciated that a process such as that broadly illustrated in FIG. 7 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 7 can be performed by way a processing unit or units and system memory such as those indicated, respectively, at 16 and 28 in FIG. 1.

As shown in FIG. 7, documents are accepted (702) and a quality specification containing predetermined quality criteria is assimilated (704). Each document is assessed based on the predetermined quality criteria (706), and a quality score is assigned to each document, the quality score being a function of positive and negative attributes assessed for each document (708).

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for automatic document quality assessment against a quality specification to standardize the document quality assessment, the method comprising:
    utilizing at least one processor to execute computer code at a computer system, the computer code configured to perform the steps of:
    accepting a plurality of business documents at an input interface of the computer system, wherein business documents in at least a subset of the plurality of business documents comprise objects other than text;
    receiving, from a user and at a graphical user interface of the computer system, predetermined quality criteria, wherein each of the predetermined quality criteria are identified as one of positive criteria and negative criteria and one of domain-specific criteria and domain-independent criteria, wherein the predetermined quality criteria are based upon quality attributes that identify attributes that result in a quality business document and wherein at least a portion of the predetermined quality criteria are directed to the objects other than text;
    creating, using a processor, the quality specification from the received predetermined quality criteria, wherein the Quality specification comprises the predetermined quality criteria, each of the predetermined quality criteria within the quality specification being identified as (i) positive or negative and (ii) domain-specific or domain-independent and having a weight assigned to each of the positive and negative criteria;
    identifying, using a processor, characteristics of each of the plurality of business documents, wherein said identifying comprises using a plurality of annotators, each annotator automatically identifying at least a subset of said characteristics, wherein the plurality of annotators are run, in sequence, on each of the plurality of documents, and wherein the annotators in the plurality of annotators are Unstructured Information Management Analysis (UIMA) annotators implemented by the at least one processor;
    automatically providing a standard quality assessment for the plurality of business documents and automatically approving business documents meeting the quality specification by:
        automatically assessing, using a processor, each of the plurality of business documents against the quality specification, wherein said assessing comprises analyzing the identified characteristics of each of the plurality of business documents against the predetermined quality criteria, wherein the automatically assessing of the plurality of business documents comprises assessing all of the plurality of business documents against the same created quality specification, and
        determining, using a processor and based upon the assessing, a quality score, based on the predetermined quality criteria and the identified characteristics, for each of the plurality of business documents, wherein the quality score is normalized and the quality score comprising:
            an additive function of positive attributes, identified in each of the plurality of business documents, multiplied by the weight associated with the positive attribute, wherein the positive attributes are based on the positive criteria, and
            a subtractive function of negative attributes, identified in each of the plurality of business documents, multiplied by the weight associated with the negative attribute, wherein the negative attributes are based on the negative criteria;
    automatically approving business documents from the plurality of documents by filtering the plurality of business documents based upon the quality score corresponding to each business document and approving business documents having a quality score exceeding a predetermined threshold as approved quality documents; and
    providing the approved quality documents to the user on the graphical user interface.

2. The method according to claim 1, wherein said determining comprises:
    applying relative weights to each of the positive and negative attributes;
    summing the weighted positive attributes;
    dividing the summed weighted positive attributes by the number of positive attributes to yield a weighted positive attribute average;
    summing the weighted negative attributes;
    dividing the summed negative positive attributes by the number of negative attributes to yield a weighted negative attribute average; and
    subtracting the weighted negative attribute average from the weighted positive attribute average to yield the quality score.

3. The method according to claim 1, further comprising applying a quality score threshold and accepting as output solely those business documents meeting or exceeding the quality score threshold.

4. The method according to claim 1, wherein the predetermined quality criteria relate to document quality in connection with one or more from the group consisting of: grammar, usage and diction.

5. The method according to claim 1, wherein the positive attributes comprise one or more from the group consisting of: sectioning in a document, size of sections in a document, sentence length, mentioning of predetermined concepts in a document, use of predetermined terminology in a document, inclusion of information relating to a mercantile order.

6. The method according to claim 1, wherein the negative attributes comprise one or more from the group consisting of: mentioning of predetermined non-relevant concepts in a document, use of acronyms, use of passive voice, excessive discussion of a predetermined concept in a document.

7. The method according to claim 1, wherein said assessing comprises performing operations on the business documents and the quality specification via the plurality of annotators.

8. The method according to claim 1, wherein said assessing comprises automatically assessing and reconciling the quality specification with each business document to yield a tuple corresponding to each business document, the tuple including an identifier of the business document and the quality score for the business document.

9. The method according to claim 1, wherein the quality specification is provided by the user.

10. An apparatus for automatic document quality assessment against a quality specification to standardize the document quality assessment, the apparatus comprising:
one or more processors; and
a computer readable storage medium having computer readable program code embodied therewith and executable by the one or more processors, the computer readable program code comprising:
computer readable program code configured to accept business documents at an input interface of the apparatus, wherein business documents in at least a subset of the plurality of business documents comprise objects other than text;
computer readable program code configured to receive, from a user from a user and at a graphical user interface of the apparatus, predetermined quality criteria, wherein each of the predetermined quality criteria are identified as one of positive criteria and negative criteria and one of domain-specific criteria and domain-independent criteria, wherein the predetermined quality criteria are based upon quality attributes that identify attributes that result in a quality business document and wherein at least a portion of the predetermined quality criteria are directed to the objects other than text;
computer readable program code configured to create the quality specification from the received predetermined quality criteria, wherein the quality specification comprises the predetermined quality criteria, each of the predetermined quality criteria within the quality specification being identified as (i) positive or negative and (ii) domain-specific or domain-independent and having a weight assigned to each of the positive and negative criteria;
computer readable program code configured to identify characteristics of each of the plurality of business documents, wherein said identifying comprises using a plurality of annotators, each annotator automatically identifying at least a subset of said characteristics, wherein the plurality of annotators are run, in sequence, on each of the plurality of business documents, and wherein the annotators in the plurality of annotators are Unstructured Information Management Analysis (UIMA) annotators implemented by the one or more processors;
computer readable program code configured to automatically provide a standard quality assessment for the plurality of business documents and to automatically approve business documents meeting the quality specification by:
computer readable program code configured to automatically assess each of the plurality of business documents against the quality specification, wherein said assessing comprises analyzing the identified characteristics of plurality of business documents against the predetermined quality criteria, wherein the automatically assessing of the plurality of business documents comprises assessing all of the plurality of business documents against the same quality specification, and
computer readable program code configured to determine, based upon the assessment, a quality score, based on the predetermined quality criteria and the identified characteristics, for each of the plurality of business documents, wherein the quality score is normalized and the quality score comprising:
an additive function of positive attributes, identified in each of the plurality of business documents, multiplied by the weight associated with the positive attribute, wherein the positive attributes are based on the positive criteria, and
a subtractive function of negative attributes, identified in each of the plurality of business documents, multiplied by the weight associated with the negative attribute, wherein the negative attributes are based on the negative criteria;
computer readable program code that automatically approves business documents from the plurality of business documents by filtering the plurality of business documents based upon the quality score corresponding to each business document and approving business documents having a quality score exceeding a predetermined threshold as approved quality documents; and
computer readable program code that provides the approved quality documents to the user on the graphical user interface.

11. A computer program product embodied within a non-transitory computer readable storage medium having computer readable program code embodied therewith, the computer readable program code for automatic document quality assessment against a quality specification to standardize the document quality assessment, the computer readable program code comprising:
computer readable program code configured to accept a plurality of business documents at an input interface of a computer system, wherein business documents in at least a subset of the plurality of business documents comprise objects other than text;
computer readable program code configured to receive, from a user and at a graphical user interface of the computer system, predetermined quality criteria, wherein each of the predetermined quality criteria are identified as one of positive criteria and negative criteria and one of domain-specific criteria and domain-independent criteria, wherein the predetermined quality criteria are based upon quality attributes that identify attributes that result in a quality business document and wherein at least a portion of the predetermined quality criteria are directed to the objects other than text;
computer readable program code configured to create the quality specification from the received predetermined quality criteria, wherein the quality specification comprises the predetermined quality criteria, each of the predetermined quality criteria within the quality specification being identified as (i) positive or negative and (ii) domain-specific or domain-independent and having a weight assigned to each of the positive and negative criteria;
computer readable program code configured to identify characteristics of each of the plurality of business documents, wherein said identifying comprises using a plurality of annotators, each annotator automatically identifying at least a subset of said characteristics, wherein the plurality of annotators are run, in sequence, on each of the plurality of business documents, and wherein the annotators in the plurality of annotators are Unstructured Information Management Analysis (UIMA) annotators implemented by one or more processors of the computer system;

computer readable program code configured to automatically provide a standard quality assessment for the plurality of business documents and to automatically approve business documents meeting the quality specification by:

computer readable program code configured to automatically assess each of the plurality of business documents against the quality specification, wherein said assessing comprises analyzing the identified characteristics of plurality of business documents against the predetermined quality criteria, wherein the automatically assessing of the plurality of business documents comprises assessing all of the plurality of business documents against the same quality specification, and computer readable program code configured to determine, based upon the assessment, a quality score, based on the predetermined quality criteria and the identified characteristics, for each of the plurality of business documents, wherein the quality score is normalized and the quality score comprising:

an additive function of positive attributes, identified in each of the plurality of business documents, multiplied by the weight associated with the positive attribute, wherein the positive attributes are based on the positive criteria, and a subtractive function of negative attributes, identified in each of the plurality of business documents, multiplied by the weight associated with the negative attribute, wherein the negative attributes are based on the negative criteria;

computer readable program code that automatically approves business documents from the plurality of business documents by filtering the plurality of business documents based upon the quality score corresponding to each business document and approving business documents having a quality score exceeding a predetermined threshold as approved quality documents; and computer readable program code that provides the approved quality documents to the user on the graphical user interface.

12. The computer program product according to claim 11, wherein said computer readable program code is configured to determine a quality score via:

applying relative weights to each of the positive and negative attributes;

summing the weighted positive attributes;

dividing the summed weighted positive attributes by the number of positive attributes to yield a weighted positive attribute average;

summing the weighted negative attributes;

dividing the summed negative positive attributes by the number of negative attributes to yield a weighted negative attribute average; and subtracting the weighted negative attribute average from the weighted positive attribute average to yield the quality score.

13. The computer program product according to claim 11, wherein said computer readable program code is further configured to apply a quality score threshold and accept as output solely those business documents meeting or exceeding the quality score threshold.

14. The computer program product according to claim 11, wherein the predetermined quality criteria relate to document quality in connection with one or more from the group consisting of: grammar, usage and diction.

15. The computer program product according to claim 11, wherein the positive attributes comprise one or more from the group consisting of: sectioning in a document, size of sections in a document, sentence length, mentioning of predetermined concepts in a document, use of predetermined terminology in a document, inclusion of information relating to a mercantile order.

16. The computer program product according to claim 11, wherein the negative attributes comprise one or more from the group consisting of: mentioning of predetermined non-relevant concepts in a document, use of acronyms, use of passive voice, excessive discussion of a predetermined concept in a document.

* * * * *